March 2, 1937.	E. KRAMAR	2,072,267
SYSTEM FOR LANDING AIRCRAFT
Filed Aug. 12, 1933

Inventor:
Ernst Kramar
by RC Hopgood
Attorney

Patented Mar. 2, 1937

2,072,267

UNITED STATES PATENT OFFICE 2,072,267

SYSTEM FOR LANDING AIRCRAFT

Ernst Kramar, Berlin-Tempelhof, Germany, assignor to C. Lorenz Aktiengesellschaft, Berlin-Tempelhof, Germany, a company Application August 12, 1933, Serial No. 684,790
In Germany September 22, 1932

7 Claims. (Cl. 250—11)

It is well known to employ so-called slip-way beacons, which operate with ultra-short electric waves, for facilitating the landing of aeroplanes particularly when visibility is poor such as for example during fogs. It has now been found that, in general, landing grounds are too small for the effective use of these slip-way beacons, since if a landing has to be made from a considerable altitude (for example 400 metres) to a slip-way beacon which is normally used for landing from about 150 metres, then the aeroplane has first of all to descend very steeply, more steeply in fact than is practicable. A landing can only be made at a satisfactory angle from about 200 metres. If the radiation diagram of the slip-way beacon is made flatter, then a landing from a considerable altitude is possible, but in this case the diagram and consequently the line of flight of the aeroplane follow a very flat curve relative to the earth surface. It will readily be seen that the majority of landing grounds are not sufficiently long to carry out the latter method.

Furthermore, it has been ascertained that it is sufficient in many cases to lead the aircraft in a certain direction towards the landing ground and to give a signal to the pilot when the boundary of the landing ground is being flown over. It is, however, adapted for the purpose also to indicate him a certain altitude. He then only has to descend at a certain angle, this angle being more or less fixed with respect to the particular type of aircraft and the landing ground. The descent itself may also be effected by means of a slip-way beacon or by devices, explained hereafter, which operate in a manner similar to slip-way beacons. It is further advantageous to arrange for observing a certain direction also on the descent taking place.

In accordance with the present invention, in the simplest case a device is provided which indicates to the pilot on the one hand the direction of the landing ground and on the other hand also indicates when the landing ground boundary is flown over, or renders perceptible a line where the landing should begin. As is shown in the subsequent description high frequency transmitters of a kind known per se, which generate a zone of equal field intensity and operate with vertical polarization, are suitable for this purpose.

Some examples of methods of carrying out the invention are explained in the following description with reference to the accompanying drawing in which Fig. 1 is a diagrammatic plan view showing the arrangement disposed on a landing place;

Fig. 3 is a circuit diagram for the radio beacon G located on the boundary of the landing place, by means of which the method according to the invention is carried through;

Figure 1:
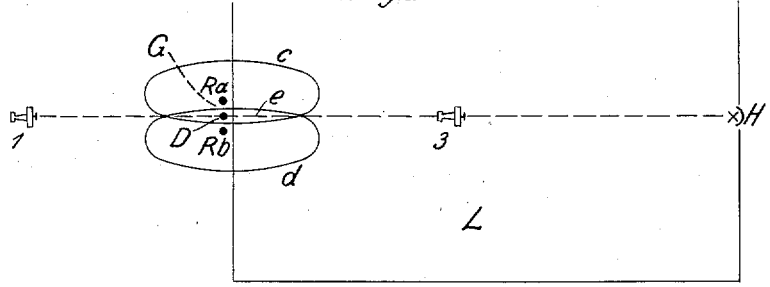
Figure 2:
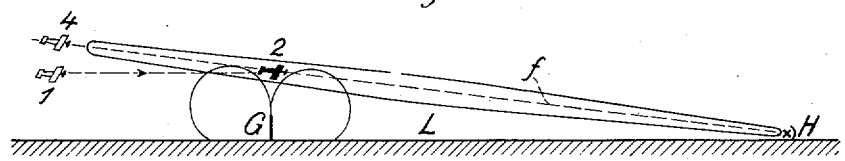
Fig. 2 is a side view representing said arrangement from which the airpath of the airplane can be seen.
Figure 3:
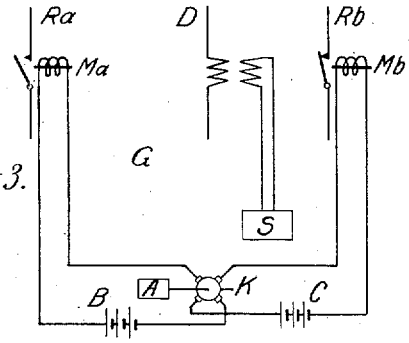

Referring first to Figs. 1 and 2, a radio beacon G is located on the boundary of the landing ground L. This radio beacon, as is also shown in Fig. 3, comprises three vertical dipoles D, $Ra$, $Rb$, arranged in the same plane. The transmitting dipole D is connected to a high frequency generator S. The reflector dipoles $Ra$, $Rb$ are each interrupted at the centre, namely at the contacts of a relay $Ma$ or $Mb$. These relays are alternately energized and de-energized, over a commutator K driven by a motor A, to render the dipoles $Ra$, $Rb$ alternately effective as reflectors. It is assumed in the drawing that the dipole $Ra$ is opened and thereby inactive and the dipole $Rb$ closed, that is, active. Sources of direct current B, C serve to energize the relays $Ma$ and $Mb$.

In place of the commutator K any other device may be provided which is suitable alternately to open and close the contacts of the relays $Ma$ and $Mb$.

The dipole D endeavors to generate a radiation which is circular in plan. This radiation diagram by that alternate manipulation or keying of the dipoles $Ra$, $Rb$ is assumed to the curves $c$, $d$, that is, in varying its form is alternately moved to one and the other side of the centre line $1,3$ (Fig. 1). Along this line, a zone $e$ of equal field intensity is formed in the well-known manner.

It is also possible to operate with different characteristic tones in the two zones $c$ and $d$. For this purpose, upon the manipulation of the reflectors $Ra$, $Rb$, the transmitter G is alternately modulated with different low frequency tones, and this in such a way that a certain characteristic tone is always allotted to the one reflector.

An aeroplane arriving at position I obtains its bearings in known manner by a comparison of the intensities of the zones of radiation $c$ and $d$, and upon approaching the boundary, intensity of reception increases.

The beacon G operates with vertical polarization. The reception on the aeroplane consequently ceases as soon as this arrives in position 2, that is when it overflies the boundary of the ground L. The pilot then knows that he must commence to land.

In landing, for example towards position 3, he can again establish his direction since after overflying the boundary of the landing ground reception from the beacon G is resumed on the aeroplane.

This arrangement has the advantage that the signals coming from the beacon G do not alternate from one side to the other when the beacon G is being overflown. In the customary radio beacons the radiation diagrams are not aside each other, as is the case with the diagrams $c$, $d$, but the radiation diagrams thereof are such that there are equal signals in the first and third quadrants or in the second and fourth quadrants, that is, the signals alternate from one side to the other on the beacon being overflown. This can give rise to ambiguities.

In order that an aeroplane shall arrive at the landing ground at a suitable altitude, additional arrangements may be provided. For example on the boundary of the landing ground L opposite to the beacon G, there is located a further beacon H, which transmits a pencil of rays $f$ at such an inclination that it passes over the beacon G, at the height at which the landing should be commenced.

The aeroplane is guided to the ground L by means of the beacon G which indicates the direction in the manner already described. The reception on the aeroplane derived from this beacon ceases for the reason already stated as soon as the boundary of the ground L is overflown, but upon flying through the ray $f$ reception is commenced of the transmission which originates from the beacon H. The pilot thereupon knows that he must begin to descend.

If an aeroplane arrives, say in position 4, it encounters the radiation $f$ whilst it is still under the influence of the directional beacon G. The aeroplane must then be so controlled that it does not come out of the path of the radiation $f$ and thus arrives in position 2.

Instead of the pencil of rays $f$ the radiation of a slip-way beacon may be provided or an oblique plane of radiation may be utilized. It is possible to use such a plane of radiation because the direction therein would be indicated by the beacon G.

Furthermore, an arrangement is adapted for the purpose that acts by producing a guide line. The use of such a guide line, however, is by no means restricted to simultaneously using that device which serves to indicate the line to be overflown, but may serve also other purposes.

In this connection the invention proposes to employ those well-known direction-finding methods by which a zone of equal intensity is produced, and to employ them twice in observing space relationships and arranging them at a suitable angle to each other. For producing this guide line all the methods of directional flying which are known in connection with the stationary radio beacons may be adopted. The said twofold application, however, besides provides for an orientation in the third dimension.

The said guide line likewise allows the aircraft to descend, because it is quite sufficient for the requirements of air traffic to descend in a straight line. It is here, contrarily to the slip-way beacons, not necessary to descend in a curve, provided that the guide line is placed at a suitable angle with respect to the earth surface (this angle will at most be between 8° and 11°). This is connected with the fact that the aircraft must be stopped before coming against the ground, the pilot having to look at the ground in order to effect landing.

Figure 5:
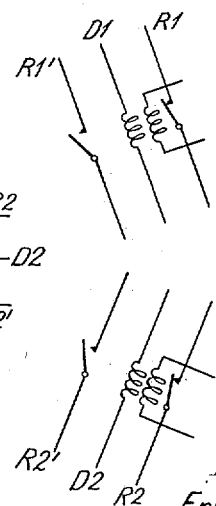
Fig. 5 shows the angle position of the arrangement according to Fig. 4 required for producing the guiding line.
Figure 4:
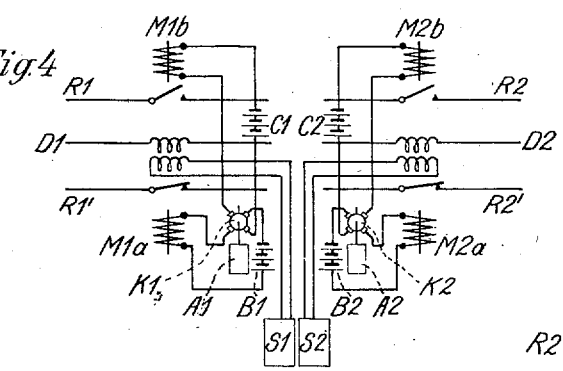
Fig. 4 shows an arrangement which, essentially, consists of the double arrangement of Fig. 3 and which serves for producing a guiding line to lead the airplane from the landing place boundary down to the landing place.

Fig. 4, that relates to a transmitting system adapted for producing such guide line, shows two transmitter dipoles D1, D2, four reflecting dipoles R1, R2, R1', R2', four relays M1a, M1b, M2a, M2b, two motors A1, A2, two commutators K1, K2, four direct current sources B1, C1, B2, C2, and two high frequency generators S1, S2. The commutator K1 is mounted on the shaft of the motor A1 and the commutator K2 on the shaft of the motor A2. These components are connected up as shown in the drawing. The dipoles D1, D2, R1, etc., are substantially horizontally arranged. The dipoles D1, R1, R1' are situated vertically over each other, as are also the dipoles D2, R2, R2'. These two groups of dipoles are inclined at the same angle to the earth surface and form a suitable angle with each other. As illustrated in Fig. 5 this is an obtuse angle. The dipoles R1, R1', R2, R2' are interrupted in the centre and may be closed by the relays M1a, M1b, M2a, M2b.

The relays M1a, M1b, M2a, M2b are alternately inserted and cut out by the commutators K1, K2. It is assumed in the drawing that the dipoles R1, R2 are open, that is, inactive, and the dipoles R1', R2' closed, that is, active.

Instead of the commutators K1 and K2, any other device may be provided which is adapted alternately to open and close the relay contacts situated in the dipoles R1, R1', R2, R2'. The arrangement of Fig. 4 is a doubling of that shown in Figs. 1 and 3. It thus generates two zones of equal field intensity like zone $e$ shown in Fig. 1. These two zones intersect in a line along which the aeroplanes can descend, i. e. the said guide line.

The receiving apparatus disposed on the aircraft are constructed so that the lateral orientation and the orientation regarding altitude shall differ from each other. As stated before, characteristic tones will be used here by preference and receiving devices be employed which are tuned to the several characteristic tones. It is possible also to operate by a certain keying and certain signals. More details on this subject are however not essential to the idea of the invention. If the guide line is used in conjunction with the device by which the overflying of a certain line, such as the landing ground boundary, is indicated, then it is advantageous to construct the receiving devices so that the several indicating instruments or the appertaining receiving devices can be cut in selectively by the pilot.

In order that the entire arrangement may show sufficient stability in operation, it is advantageous to provide a control device common to the transmitting devices. This measure will be adopted in any case where the arrangements are operating by means of equal waves. If they are operating by different waves then it may under certain circumstances also here be advantageous to employ a common control transmitter and to multiply accordingly, or to adopt other measures of this nature.

It is a matter of the organization of service whether the several means are to be stationary or movable, the movable arrangement being intended to enable landing at different wind relationships. These, however, in most cases need not be taken into consideration, since the described arrangements are to be employed preferably during fogs, that is when there is no wind at all. In this event landing will in most cases be effected merely with regard to the conditions peculiar to the landing ground, i. e. in the direction of the longest dimension thereof, so that the arrangements may be stationary. If, however, the plants are required to be movable, then it is of no importance whether the high-frequency generator is arranged to share in any movements or is stationary, the antenna dipoles in the latter case being connected to it by suitable energy lines.

What is claimed is:

1. In a system for landing aircraft by means of electromagnetic waves, the combination of a transmitter of electromagnetic waves including an antenna operable with vertical polarization positioned on the line above which landing should be commenced, and means co-operating with said transmitter to cause said antenna to so emit waves as to produce two distinguishable signal indicating conditions, one being an elongated zone of equal field intensity thereby to indicate to the pilot of the aircraft the direction in which landing thereof should be effected, and the other serving to indicate to said pilot when the aircraft arrives at the point in space from which landing should be commenced.

2. In a system for landing aircraft by means of electromagnetic waves, the combination of a transmitter of electromagnetic waves, means associated therewith for causing said transmitter to so emit said waves with vertical polarization as to indicate to the pilot of the aircraft the direction in which landing thereof should be effected and also to give him an indication when the aircraft arrives at the position in space from which landing should be commenced, and means co-operating with said transmitter to indicate to the pilot the height at which the aircraft is moving when crossing the line above which landing should be commenced.

3. In a system for landing aircraft by means of electromagnetic waves, the combination of a transmitter of electromagnetic waves, means associated therewith for causing said transmitter to indicate to the pilot of the aircraft the direction in which landing thereof should be effected and also to give him an indication when the aircraft crosses the line above which landing should be commenced, and means positioned in spaced relation to said antenna for producing a pencil of electromagnetic waves inclined to the earth's surface and crossing the said line at the height from which landing of the aircraft should be commenced.

4. In a system for landing aircraft by means of electromagnetic waves, the combination of a transmitter of electromagnetic waves, means associated therewith for causing said transmitter to indicate to the pilot of the aircraft the direction in which landing thereof should be effected and also to give him an indication when the aircraft crosses the line above which landing should be commenced, and means positioned in spaced relation to said antenna for producing and transmitting electromagnetic waves radiated in a plane at an oblique angle to the ground to intersect the line from which landing should be effected at the appropriate height from which such landing should be commenced.

5. In a system for landing aircraft by means of electromagnetic waves, the combination of a transmitter of electromagnetic waves including a transmitting dipole operable with vertical polarization positioned on the line above which landing should be commenced, and means co-operating with said transmitter to cause said transmitting dipole so to emit waves as to produce two distinguishable signal indicating conditions, one being an elongated zone of equal field intensity thereby to indicate to the pilot of the aircraft the direction in which landing thereof should be effected, and the other serving to indicate to said pilot when the aircraft arrives at the point in space from which landing should be commenced, said means comprising two reflectors positioned on either side of said transmitting dipole and including means for alternately keying said reflectors.

6. In a system for landing aircraft by means of electromagnetic waves, the combination of two transmitters of electromagnetic waves each having an emitting antenna so spaced in angular position one with respect to the other and having means associated therewith for causing said antennae to produce a zone of equal field intensity thereby to define a guide line for the descending aircraft, each antenna being a horizontally disposed emitting dipole, and said means including two reflector dipoles for each emitting dipole disposed horizontally and on either side of the respective emitting dipole and in the same vertical plane therewith.

7. In a system for landing aircraft by means of electromagnetic waves, the combination of two transmitters of electromagnetic waves each having an emitting antenna so spaced in angular position one with respect to the other and having means associated therewith for causing said antennae to emit waves over separate areas with a portion of one area forming a portion of the other whereby a zone of equal field intensity is produced to define a guide line for the descending aircraft, said means comprising two reflector antennae for each emitting antenna, means for energizing the emitting antennae, and means for keying the reflector antennae.

ERNST KRAMAR.